(12) United States Patent
Tongu et al.

(10) Patent No.: US 10,138,788 B2
(45) Date of Patent: Nov. 27, 2018

(54) MIXING STRUCTURE

(71) Applicant: Hino Motors, Ltd., Hino-shi (JP)

(72) Inventors: Hirofumi Tongu, Tokyo (JP);
Tomoyuki Tsuruta, Tokyo (JP)

(73) Assignee: HINO MOTORS, LTD., Hino-shi (JP)

( * ) Notice: Subject to any disclaimer, the term of this patent is extended or adjusted under 35 U.S.C. 154(b) by 0 days.

(21) Appl. No.: 15/306,286

(22) PCT Filed: May 11, 2015

(86) PCT No.: PCT/JP2015/063424
§ 371 (c)(1),
(2) Date: Oct. 24, 2016

(87) PCT Pub. No.: WO2015/178231
PCT Pub. Date: Nov. 26, 2015

(65) Prior Publication Data
US 2017/0044957 A1    Feb. 16, 2017

(30) Foreign Application Priority Data

May 20, 2014    (JP) .................. 2014-104195

(51) Int. Cl.
*F01N 13/08* (2010.01)
*F01N 3/28* (2006.01)
(Continued)

(52) U.S. Cl.
CPC ........ *F01N 3/2892* (2013.01); *B01F 3/04049* (2013.01); *B01F 5/0451* (2013.01);
(Continued)

(58) Field of Classification Search
CPC .............. F01N 3/2892; F01N 2240/20; F01N 2330/38; F01N 2470/18
See application file for complete search history.

(56) References Cited

U.S. PATENT DOCUMENTS

2010/0083643 A1*   4/2010   Hayashi ................. B01D 53/90
                                                                60/297
2014/0077400 A1    3/2014   Sampath et al.
2015/0041996 A1    2/2015   Kowada et al.

FOREIGN PATENT DOCUMENTS

DE    10 2007 020 812 A1    11/2008
EP            2551482 A1 *    1/2013    ............. F01N 3/106
(Continued)

OTHER PUBLICATIONS

International Search Report dated Aug. 4, 2015 in PCT/JP2015/063424 filed May 11, 2015.
(Continued)

*Primary Examiner* — Jonathan Matthias
(74) *Attorney, Agent, or Firm* — Oblon, McClelland, Maier & Neustadt, L.L.P.

(57) ABSTRACT

A lattice board is obliquely arranged in a bent portion halfway in an exhaust pipe where exhaust gas flows curvedly so as to bisect an angle made by inflow and outflow directions the exhaust gas entered upstream of and discharged downstream of the bent portion, respectively. An injector is arranged in the outflow direction of the exhaust gas to inject urea water to an entry side of the lattice board such that flow passage walls of the lattice board on which hit is the exhaust gas from upstream has rear surfaces on which hit is a spray of urea water from the injector.

2 Claims, 3 Drawing Sheets

(51) Int. Cl.
- *F01N 3/20* (2006.01)
- *B01F 5/04* (2006.01)
- *B01F 5/06* (2006.01)
- *B01F 3/04* (2006.01)
- *B01F 5/00* (2006.01)

(52) U.S. Cl.
CPC .......... *B01F 5/0473* (2013.01); *B01F 5/0616* (2013.01); *F01N 3/2066* (2013.01); *B01F 2005/0091* (2013.01); *F01N 2240/20* (2013.01); *F01N 2610/02* (2013.01); *F01N 2610/1453* (2013.01); *Y02T 10/24* (2013.01)

(56) References Cited

FOREIGN PATENT DOCUMENTS

| | | |
|---|---|---|
| FR | 2 906 838 A1 | 4/2008 |
| JP | 2011033011 A * | 2/2011 |
| JP | 2012-72771 A | 4/2012 |
| JP | 2013-2337 A | 1/2013 |
| JP | 2013-24075 A | 2/2013 |
| JP | 2013-217350 A | 10/2013 |
| WO | 2008/111254 A1 | 9/2008 |

OTHER PUBLICATIONS

European Search Report issued in European Application No. 15796811.6 dated Jan. 12, 2018.

* cited by examiner

MIXING STRUCTURE

TECHNICAL FIELD

The present invention relates to a mixing structure for adding an additive halfway in an exhaust system to disperse the additive into exhaust gas while facilitating vaporization of the additive.

BACKGROUND ART

Conventionally, some diesel engines have a selective reduction catalyst incorporated in an exhaust pipe through which exhaust gas flows, said catalyst having a feature of selectively reacting $NO_x$ (nitrogen oxides) with a reducing agent even in the presence of oxygen. A required amount of reducing agent is added upstream of the reduction catalyst and is reductively reacted on the catalyst with $NO_x$ in the exhaust gas to thereby reduce a concentration of $NO_x$ discharged.

Meanwhile, effectiveness of ammonia ($NH_3$) used as a reducing agent for reduction and purification of $NO_x$ is well known in a field of industrial flue gas denitration in a plant or the like. However, in a field of automobile where safety is hard to assure as to running with ammonia itself being loaded, it has been proposed to use nontoxic urea water as reducing agent.

Specifically, the urea water added into the exhaust gas upstream of the selective reduction catalyst is thermally decomposed into ammonia and carbon dioxide gas according to the following formula to satisfactorily depurate NO in the exhaust gas through reduction on the catalyst by the ammonia.

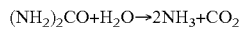   [Chemical Formula 1]

$$(NH_2)_2CO + H_2O \rightarrow 2NH_3 + CO_2$$

FIG. 1 is an example of conventional art for addition of urea water into exhaust gas upstream of a selective reduction catalyst. In the example illustrated, an exhaust pipe 1 has an outer periphery formed with a bulge portion 2 protruding obliquely upstream. Mounted on an upstream side of the bulge portion 2 is an injector 3 which is directed obliquely downstream to approach to an inside of the exhaust pipe 1 so as to add urea water 5 while protecting the injector 3 from being directly exposed to the flow of the hot exhaust gas 4.

Arranged in the exhaust pipe 1 downstream of the added position of the urea water 5 by the injector 3 is a lattice board 6 on which hit is urea water 5 sprayed from the injector 3 for dispersion and facilitated vaporization of the urea water 5. As enlargedly shown in FIG. 2, the lattice board 6 is axially provided with a number of flow passages 6a. The flow passages 6a are provided, on their discharge sides, with alternately reversely directed fins 6b so that flows of the exhaust gas 4 discharged from the flow passages 6a are sorted alternately in reverse directions, which facilitates hitting and dispersion of the urea water 5 on the fins 6b and into the exhaust gas 4.

With respect to this kind of mixing structure, there exists, for example, the following Patent Literature 1 as conventional art document.

CITATION LIST

Patent Literature

Patent Literature 1: JP 2013-217350A

SUMMARY OF INVENTION

Technical Problems

In the conventional mixing structure as mentioned in the above, the lattice board 6 is usually arranged in a selected one of straight portions in the exhaust pipe 1 such that the lattice board 6 is substantially at right angle to and blocks the selected straight portion from a viewpoint of efficiently increasing a temperature of a whole of the lattice board 6 by heat of the exhaust gas 4. However, such straight portions in the exhaust pipe 1 are limitative in number so that it is often difficult to arrange the injector 3 in such straight portion while avoiding interference with peripheral devices and structures, disadvantageously resulting in a lower degree of freedom in layout of the injector 3 and lattice board 6.

Moreover, in the conventional mixing structure, the spray of urea water 5 injected obliquely from the injector 3 to a downstream side in the flow of the exhaust gas 4 tends to be instantly accompanied with the flow of the exhaust gas 4 and pass through without contact with flow passage walls in the lattice board 6 extending in parallel with an inflow direction of the exhaust gas 4. Thus, it has been desired to attain further enhancement of vaporization efficiency of the urea water 5.

Moreover, any straight portion of the exhaust pipe 1 itself is inherently a portion extremely low in pressure loss; however, to arrange the lattice board 6 in the straight portion has an adverse effect of increasing the pressure loss. Specifically, in the lattice board 6 as shown in FIGS. 1 and 2, hitting of the exhaust gas flows on the fins 6b on the discharge sides of the flow passages 6a are continuously followed by hitting of the exhaust gas flows on an inner periphery of the exhaust pipe 1, resulting in still further increase in pressure loss.

The invention was made in view of the above and has its object to provide a mixing structure which can enhance a degree of freedom in layout of an injector and a lattice board as well as evaporation efficiency of urea water or other additive while suppressing any pressure loss resulting from arranging the lattice board.

Solution to Problems

The invention is directed to a mixing structure having a lattice board axially with a number of flow passages and arranged halfway in an exhaust system, an additive added upstream of the lattice board being hit on flow passage walls in said lattice board for dispersion and facilitated vaporization of the additive, said mixing structure comprising said lattice board arranged obliquely in a flow changing portion halfway in the exhaust system where the exhaust gas flows curvedly so as to substantially bisect an angle in said flow changing portion made by inflow and outflow directions of the exhaust gas from upstream of and discharged downstream of said flow changing portion, respectively, and an injector arranged to inject the additive in the outflow direction of said exhaust gas to an entry side of said lattice board such that the flow passage walls in said lattice board on which hit is the exhaust gas from upstream of said flow changing portion have rear surfaces on which hit is a spray of the additive from said injector.

This enables the lattice board to be arranged in a most suitable one selected among a number of flow changing portions existing halfway in the exhaust system, so that upon arranging the injector for addition of the additive upstream of the lattice board, interference of the injector with peripheral devices and structures can be easily averted, resulting in enhancing freedom in layout of the injector and lattice board to a degree unattainable in the conventional art.

Since the flow passage walls in the lattice board on which hit is the exhaust gas from upstream of the flow changing portion have the rear surfaces on which hit is the spray of additive from the injector, the spray of the additive becomes hardly affected by the flows of the exhaust gas and is easily hit on the flow passage walls in the lattice board. Moreover, the flow passage walls on which hit is the additive have front surfaces effectively heated through hitting of the exhaust gas, so that vaporization of the sprayed additive is remarkably facilitated to enhance vaporization efficiency to a degree unattainable in the conventional art.

Moreover, in the flow changing portion which inherently has increased pressure loss due to the exhaust gas flowing curvedly, the lattice board is arranged obliquely so as to substantially bisect the angle made by the inflow and outflow directions of the exhaust gas, so that any deviant flows of the exhaust gas outward of the curved direction can be remedied through straightening effect by the flow passages in the lattice board, whereby pressure loss can be reduced in comparison with a case without a lattice board.

Further, it is preferable in the invention that fins are arranged on the discharge sides of the flow passages in the lattice board to guide the flows of the exhaust gas to the outflow direction from the flow changing portion. This enables the flows of the exhaust gas discharged from the flow passages in the lattice board to be guided by the fins to the outflow direction, so that the straightening effect by the flow passages in the lattice board can be further enhanced to further reduce the pressure loss.

Advantageous Effects of Invention

According to the above-mentioned mixing structure of the invention, various excellent effects as mentioned below can be obtained.

(I) The lattice board is arranged obliquely in the flow changing portion halfway in the exhaust system where the exhaust gas flows curvedly so as to substantially bisect the angle made by the inflow and outflow directions of the exhaust gas from upstream and discharged downstream of the flow changing portion, respectively; and the injector is arranged to inject the additive in the outflow direction of the exhaust gas to the entry side of the lattice board such that the flow passage walls in the lattice board on which hit is the exhaust gas from upstream of the flow changing portion have rear surfaces on which hit is the sprayed additive from the injector. As a result, freedom in layout of the injector and the lattice board can be substantially enhanced to a degree unattainable in the conventional art, and vaporization efficiency of the urea water or other additive can be substantially enhanced to a degree unattained in the conventional art; and further, any pressure loss due to arranging the lattice board can be substantially suppressed.

(II) The fins provided on the discharge sides of the flow passages in the lattice board can guide the flows of the exhaust gas to the outflow direction from the flow changing portion, so that the straightening effect by the flow passages in the lattice board can be further enhanced to further reduce the pressure loss.

DESCRIPTION OF EMBODIMENTS

Embodiments of the invention will be described in conjunction with the drawings.

Figure 1:
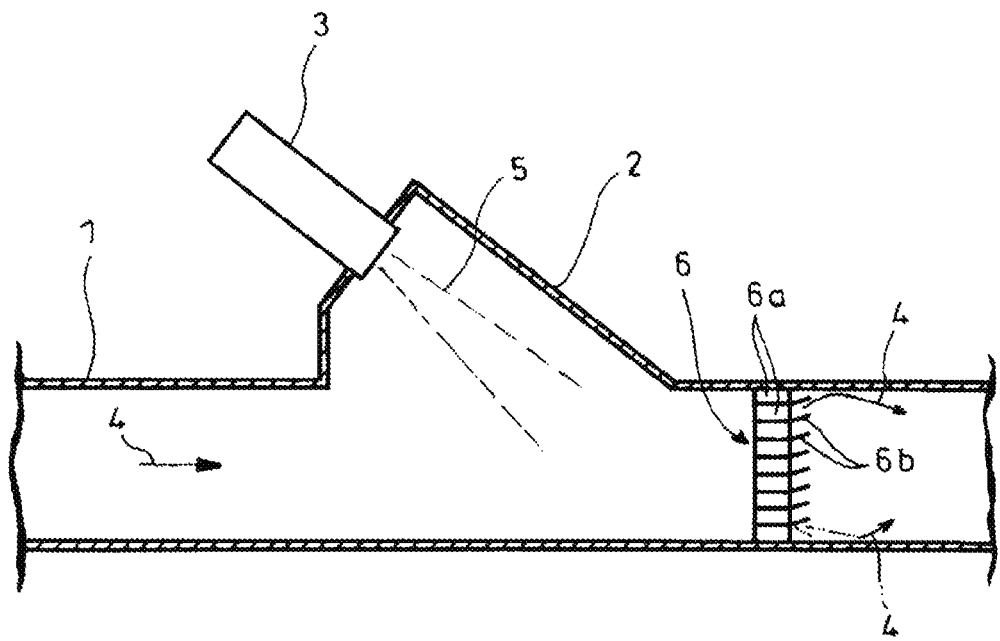
FIG. 1 is a sectional view showing an example of a conventional mixing structure.
Figure 2:
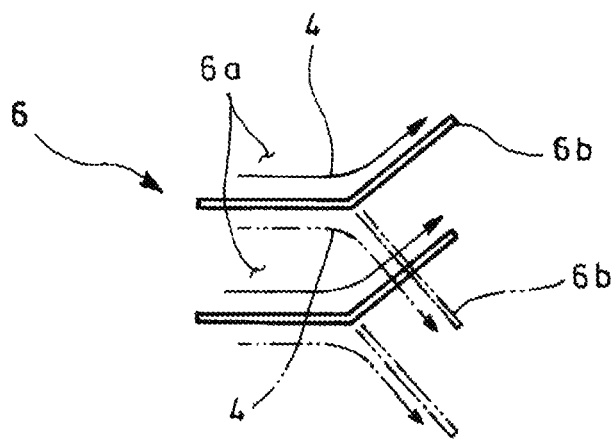
FIG. 2 is a enlarged view showing particulars of flow passages in a lattice board in FIG. 1.
Figure 3:
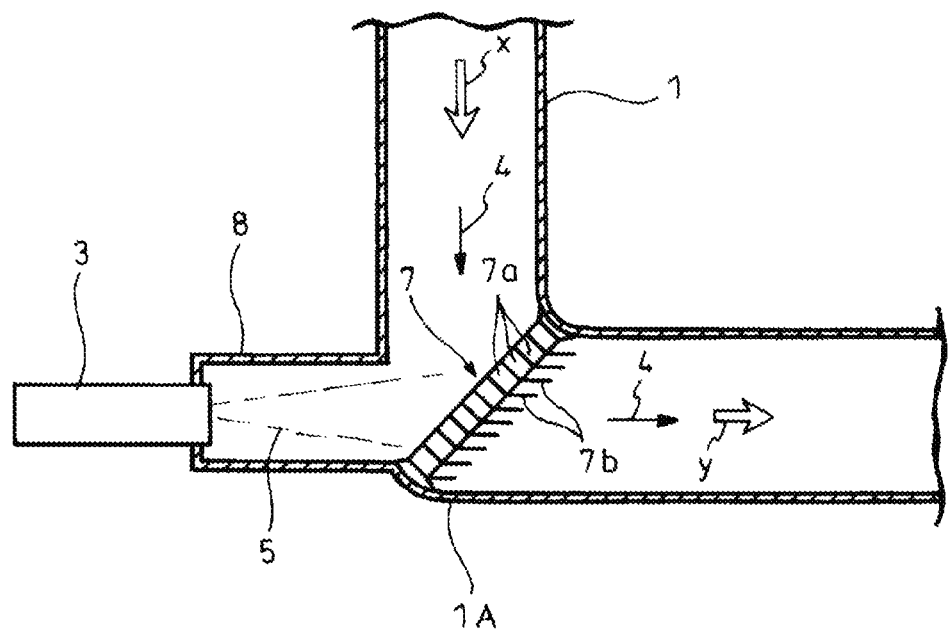
FIG. 3 is a sectional view showing a first embodiment of the invention.

FIG. 3 shows a first embodiment of the invention. In the embodiment illustrated, arranged obliquely in a bent portion 1A (a flow changing portion where exhaust gas 4 flows curvedly) halfway in an exhaust pipe 1 (an exhaust system) is a lattice board 7 so as to substantially bisect an angle made by inflow and outflow directions (see arrows x and y in FIG. 3, respectively) of the exhaust gas 4 from upstream of and discharged downstream of the bent portion 1A, respectively.

The lattice board 7 axially has a number of flow passages 7a provided, on discharge sides of the flow passages 7a, with fins 7b guiding the flows of the exhaust gas 4 to the outflow direction from the bent portion 1A, so that the straightening effect by the flow passages 7a and the fins 7b is afforded to the exhaust gas 4 flowing curvedly in the bent portion 1A.

Figure 4:
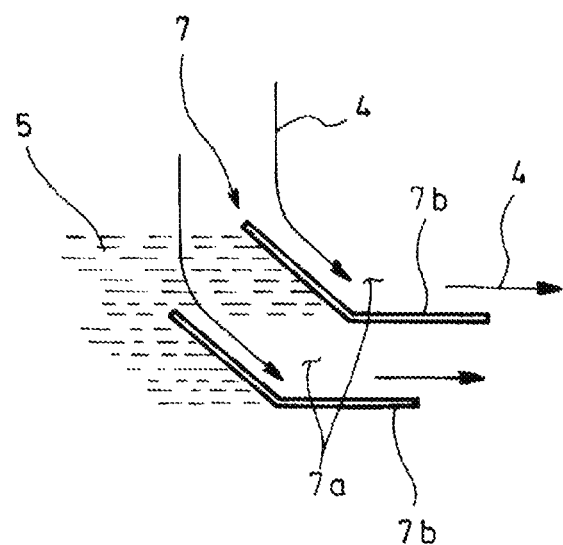
FIG. 4 is an enlarged view showing particulars of flow passages in a lattice board in FIG. 3.

With respect to the lattice board 7A, arranged on an opposite side to the exhaust pipe 1 extending downstream from the bent portion 1A and through a bulge portion 8 is an injector 3 so as to inject urea water 5 (additive) in the outflow direction of the exhaust gas 4 to an entry side of the lattice board 7 such that, as shown in enlarged scale in FIG. 4, the flow passage walls of the lattice board 7 on which hit is the exhaust gas 4 from upstream of the bent portion 1A has rear surfaces on which hit is the urea water 5 sprayed from the injector 3.

This enables selection of a most appropriate one among a number of bent portions 1A halfway in the exhaust pipe 1 and arrangement of the lattice board 7 in the selected bent portion so that, upon positioning the injector 3 for addition of the urea water 5 upstream of the lattice board 7, the injector 3 can be easily prevented from being interfered with peripheral devices and structures and thus freedom in layout of the injector 3 and lattice board 7 can be enhanced to a degree unattainable in the conventional art.

Further, since the flow passage walls in the lattice board 7 on which hit is the exhaust gas 4 from upstream of the bent portion 1A has the rear surfaces on which hit is the spray of the urea water 5 from the injector 3, the spray of the urea water 5 becomes hardly affected by the flows of the exhaust gas 4 and is easily hit on the flow passage walls of the lattice board 7 and moreover the flow passage walls are effectively heated through the hitting of the exhaust gas 4 on the front surfaces of the walls. As a result, vaporization of the spray of the urea water 5 is substantially facilitated to enhance the vaporization efficiency to a degree unattainable in the conventional art.

The fact that the lattice board 7 is obliquely arranged in the bent portion 1A inherently having increased pressure loss due to the exhaust gas 4 flowing curvedly so as to substantially bisect the angle made by the inflow and outflow directions of the exhaust gas 4 can remedy any deviant flows of the exhaust gas 4 outward of the curved direction through the straightening effect by the flow passages 7a in the lattice board 7 and thus can reduce the pressure loss in comparison with a case without a lattice board 7.

Especially, in the embodiment, the flow passages 7a have the fins 7b on their discharge sides to guide the flows of the exhaust gas 4 discharging from the flow passages 7a in the lattice board 7 to the outflow direction so that the straightening effect by the flow passages 7a in the lattice board 7 can be further enhanced to further reduce the pressure loss.

Thus, according to the above embodiment, a degree of freedom in layout of the injector 3 and lattice board 7 can be substantially enhanced in comparison with the conventional art; vaporization efficiency of the urea water 5 can be substantially enhanced in comparison with the conventional art; and further, any pressure loss due to arranging the lattice board 7 can be substantially suppressed through the straightening effect by the flow passages 7a and the fins 7b.

Figure 5:
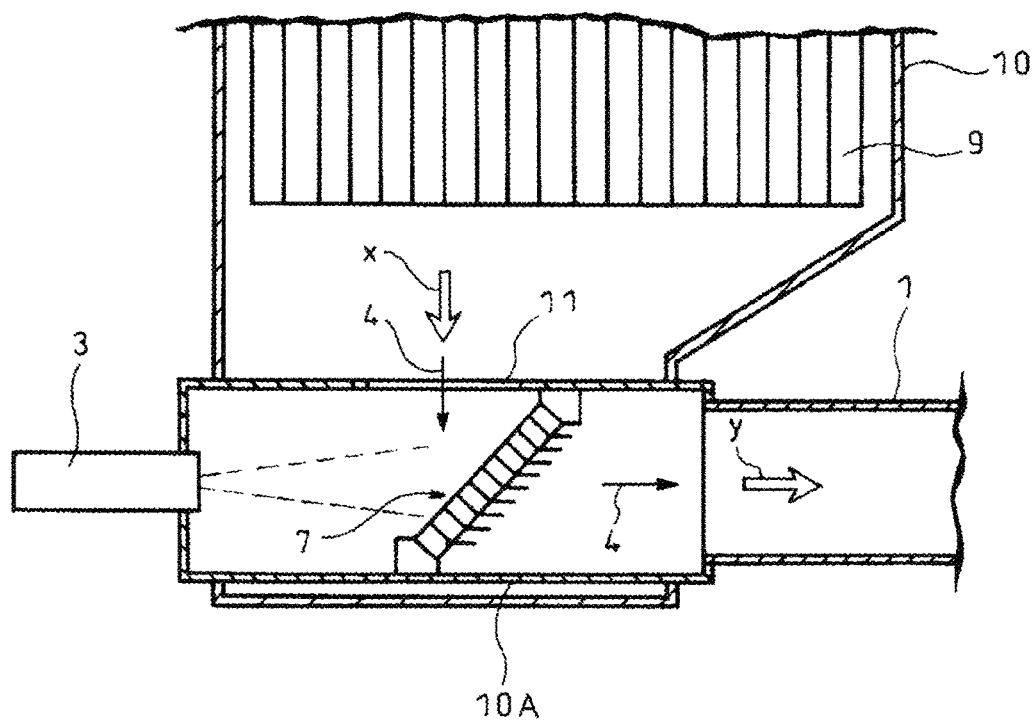
FIG. 5 is a sectional view showing a second embodiment of the invention.

FIG. 5 shows a second embodiment of the invention which is an example applied to a flow changing portion 10A arranged on a discharge side of a casing 10 having an exhaust-gas purifying member 9 such as a particulate filter or an exhaust purifying catalyst so as to extract the exhaust gas 4 to an exhaust pipe 1 perpendicular to an axis of the member 9.

In the embodiment illustrated, the flow changing portion 10A is in the form of a chamber on an discharge side of the casing 10, extends axially of the downstream exhaust pipe 1 and has an opening 11 through which the exhaust gas 4 having passed the exhaust-gas purifying member 9 enters and flows curvedly to the exhaust pipe 1. A lattice board 7 is obliquely arranged to substantially bisect an angle made by inflow and outflow directions of the exhaust gas 4 (see arrows x and y in FIG. 5) from the opening 11 and discharged to the downstream exhaust pipe 1, respectively.

Then, with respect to the lattice board 7, arranged in a position in the flow changing portion 10A opposite to the downstream-side exhaust pipe 1 is an injector 3 capable of injecting a spray of urea water 5 (additive) to an entry side of the lattice board 7 in the outflow direction of the exhaust gas 4 such that the flow passage walls in the lattice board 7 on which hit is the exhaust gas 4 from the opening 11 have rear surfaces on which hit is the spray of the urea water 5 from the injector 3 (see FIG. 4).

Thus, in such a case where the exhaust gas 4 flows curvedly at the discharge end of the casing 10 having the exhaust gas purifying member 9 such as a particulate filter or an exhaust gas purifying catalyst and the injector 3 is easily prevented from interfering with peripheral devices and structures, the mixing structure according to the invention can be applied to obtain effects and advantages similar to those mentioned in the above with respect to the first embodiment.

It is to be understood that a mixing structure of the invention is not limited to the above embodiments and that various changes and modifications may be made without departing from the scope of the invention. For example, the flow changing portion is not necessarily restricted to a bent portion halfway of the exhaust system. The additive used is not necessarily restricted to urea water. The invention may be combined with any catalyst other than a selective reduction catalyst or a particulate filter.

REFERENCE SIGNS LIST 1 exhaust pipe (exhaust system)
1A bent portion (flow changing portion)
3 injector
4 exhaust gas
5 urea water (additive)
7 lattice board
7a flow passage
7b fin
10A flow changing portion

The invention claimed is:

1. An exhaust system with a mixing structure having a lattice board axially with a number of flow passages and arranged halfway in the exhaust system, an additive added upstream of the lattice board being hit on flow passage walls in said lattice board for dispersion and facilitated vaporization of the additive, said mixing structure comprising said lattice board arranged obliquely in a flow changing portion halfway in the exhaust system where the exhaust gas flows curvedly so as to bisect an angle in said flow changing portion made by inflow and outflow directions of the exhaust gas from upstream of and discharged downstream of said flow changing portion, respectively, fins arranged on discharge sides of the flow passages in the lattice board and extending parallel to the outflow direction of the exhaust gas to guide flows of exhaust gas to the outflow direction from the flow changing portion, and an injector arranged to inject the additive in the outflow direction of said exhaust gas to an entry side of said lattice board such that the flow passage walls in said lattice board on which hit is the exhaust gas from upstream of said flow changing portion have rear surfaces on which hit is a spray of the additive from said injector, wherein any deviant flow of the exhaust gas outward of the curved direction by the flow passages in the lattice board is remedied and the flows of the exhaust gas discharging from the flow passages in the lattice board are guided to the outflow direction to provide an exhaust gas straightening effect by the flow passages and the fins.

2. The exhaust system according to claim 1, wherein the injector is arranged in a bulge portion of the exhaust system, the bulge portion extending parallel to the outflow direction of the exhaust gas and being perpendicular to the inflow direction of the exhaust gas.

* * * * *